Figure 1:
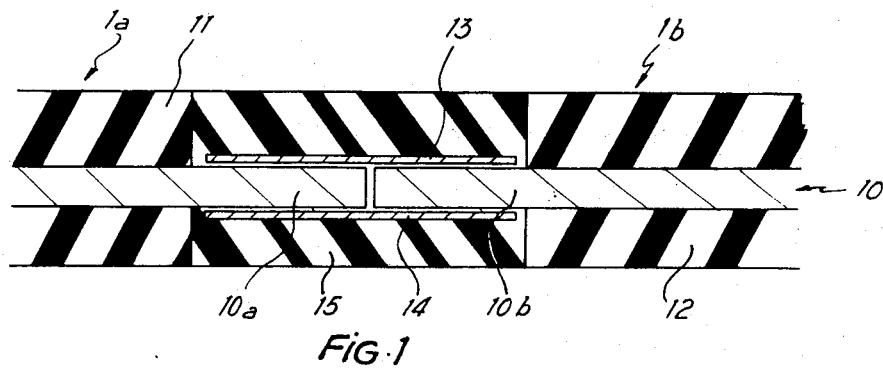

United States Patent
Jaubert et al.

[15] 3,693,218
[45] Sept. 26, 1972

[54] CONVEYOR BELTS

[72] Inventors: Pierre Jaubert, 12, rue de la Meulomiere, 92 Rueil-Malmaison; Jean Lassere, 9, rue Albert Lawrenson, 92 Boulogne, both of France

[22] Filed: Oct. 6, 1971

[21] Appl. No.: 186,953

[30] Foreign Application Priority Data

Oct. 12, 1970  France.....................7036843

[52] U.S. Cl..................24/38, 74/231 J, 156/159, 198/193
[51] Int. Cl. ............................F16g 3/00, B32b 7/08
[58] Field of Search.........74/231 J, 238, 239, 231 R, 74/232, 231 P, 233, 234, 237; 198/193; 156/137, 159; 198/193; 24/31 R, 31 W, 31 L, 38, 31 B, 31 C

[56] References Cited

UNITED STATES PATENTS

| | | | |
|---|---|---|---|
| 1,735,686 | 11/1929 | Kimmich | 24/38 |
| 2,281,148 | 4/1942 | Freedlander | 74/233 |
| 2,496,695 | 2/1950 | Brunner | 24/31 R |
| 3,481,807 | 12/1969 | Kanamori | 156/159 |
| 3,498,684 | 3/1970 | Hallaman | 198/193 X |
| 3,546,054 | 12/1970 | Ross | 74/231 J X |

FOREIGN PATENTS OR APPLICATIONS

| | | | |
|---|---|---|---|
| 150,466 | 3/1953 | Australia | 156/137 |
| 1,292,243 | 3/1962 | France | 74/237 |

Primary Examiner—Donald A. Griffin
Attorney—Holcomb, Wetherill & Brisebois

[57]  ABSTRACT

This invention relates to conveyor belts and particularly to methods for making a joint in a conveyor belt that is made from rubber or like elastomeric material, that is provided with a reinforcement constituted by at least one layer of longitudinal metal cables. In accordance with the invention, two connecting strips of longitudinal metal cables are positioned in bridge fashion over the abutting ends of the reinforcing layer of two belt portions and these strips are placed on either side of the reinforcing layer to which they are connected by a thin layer of rubber or like elastomeric material, which adheres to both of them.

9 Claims, 3 Drawing Figures

CONVEYOR BELTS

The present invention relates to methods of joining conveyor belts made from elastomers, such as rubber or similar material, reinforced by at least one layer of longitudinal parallel cables, particularly metal cables; the joint may be used either for making the belts endless or continuous, or for repairing belts by replacing damaged parts thereof.

Conveyor belts of this type whose reinforcement may comprise, apart from the layer of parallel longitudinal cables, one or more layers of transverse cables, are well known; they are frequently used for conveyors where the conveyor belt is submitted to a very high tension in use. Now, one of the principal problems which are met with these conveyor belts resides in the fact that the joint or joints must be such that they do not decrease the resistance of the belt in use on the conveyor and that they must be able to be made simply in situ.

It is an object of the invention to produce a joint for conveyor belts of this type which is as easy to make as joints known up to the present time but which gives better results than the latter.

Joints are already known in which longitudinal metal cables are located on a single face at each end of the layer of longitudinal cables which have been previously bared.

Such a joint does not give satisfactory results for the belt in use which fails rapidly at the location of the joints and it can be assumed that this is explained by the fact that at the place of the joint the neutral axis, i.e. the zero-stress line, is no longer at the center of the belt which causes an elongation and, in the direction of travel, an excessive compression of the parts of the belt opposite the layer of cables of the joint and, finally, the separation and rapid opening up of the joint which is observed on the belt in service (the expression "neutral axis" signifies the fictitious axis which, upon travel of the belt, for example over the end transport drums, is neither stretched nor compressed). Joints for conveyor belts are also known which are constituted by flexible plates fixed to the two coverings of the belt.

These joints, which would appear to be very flexible, have, however, never yet been able to be made in practice; in effect, on the one hand, they form an excessive thickness which makes them vulnerable to abrasion by the materials transported and, on the other hand, the plates, which are significantly remote from the neutral axis, are subjected, at the time when the belt passes over the transport drums, to quite high stresses which cause them to become separated all the more rapidly since their fixing to the coverings of belts of the type to which the invention is applied, cannot be effected other than by sticking.

It is a further object of the invention to remove or minimize the said disadvantages in a joint that is easy to make, the efficiency of which on the belt in use is extremely high, said joint bringing about neither an increase in the transverse and longitudinal rigidity of the belt nor an excessive decrease in the thickness of the coverings at the location of the joint.

The invention consists in a method of making a joint for a conveyor belt made from rubber or like elastomeric material, provided with a reinforcement constituted by at least one layer of longitudinal metal cables, which method consists in positioning two connecting strips of longitudinal metal cables in bridge fashion over the abutting ends of the reinforcing layer of the belt, said strips being placed on either side of said reinforcing layer and being connected thereto by a thin layer of elastomer adhering to both of them.

In order further to increase the strength of the joint of the belt in use, particularly when it is subjected to high stresses in use and must pass over transport drums of small diameter then, transverse strips of fabric may be located so as to cover the ends of the connecting strips and the ends of the longitudinal metal cables of the reinforcing layers.

The invention also consists in a conveyor belt whenever incorporating a joint made according to the method of the invention.

Figure 2:
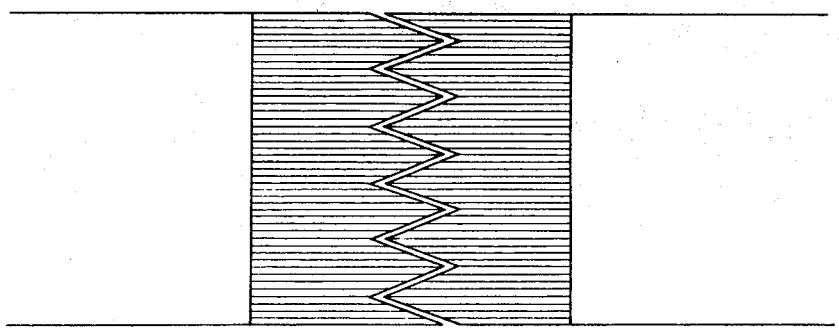
Figure 3:
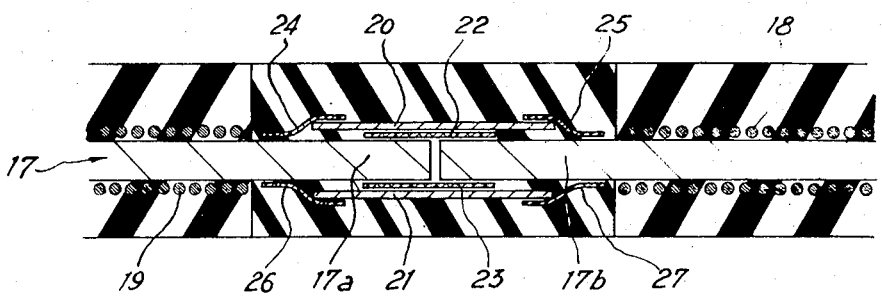

In order that the invention may be more clearly understood, reference will now be made to the accompanying drawings which show two embodiments thereof by way of example, and in which:

FIG. 1 shows a longitudinal section through a joint in accordance with the invention, FIG. 2 shows in plan a portion of the belt showing how the ends of the longitudinal cables of the reinforcement are cut so as to produce a joint according to the invention, and FIG. 3 shows a longitudinal section through another joint in accordance with the invention.

Referring now to the drawings, the joint shown in Fig. 1 is made at the two ends 1a and 1b of a continuous or closed-loop conveyor belt having a reinforcement that is constituted solely by a layer of longitudinal metal cables 10a and 10 b. The ends 1a and 1b of the belt are cut up into complementary saw-tooth shapes and, at each end, the upper and lower coverings are removed for a length which may be between half the width of, and the same width as, the belt so as to bare the ends of the reinforcement constituted by the cables 10a and 10b.

The ends of the reinforcement are abutted so that the saw-tooth shapes become mutually enmeshed, whereupon connecting strips 13 and 14 constituted by metal cables are disposed longitudinally of the belt on both sides of the reinforcement, thus forming a double bridge between the two ends of the reinforcement.

The connecting strips 13 and 14 are prepared by calendering which has for effect to embed the cables thereof in an elastomeric material such as rubber, which ensures the cohesion of the strips and the material is, moreover, so chosen that, after vulcanization, it adheres very strongly to the cables 13 and 14 and to the cables 10a and 10b of the reinforcement; the strips 13 and 14 and the cables 10a and 10b may have also been subjected to an appropriate known treatment, not forming part of the invention, for facilitating this adherence.

After having positioned the connecting strips 13 and 14 on both sides of the cables 10a and 10b, the removed parts of the coverings 11 and 12 of the belt are replaced by plates 15 and 16 of non-vulcanized rubber so as to reconstitute the coverings; thereafter, the joint assembly is vulcanization in the usual fashion.

The cables of the strips 13 and 14 are so chosen as to have an elongation which, under the tension in use of the belt, is at least equal to, and preferably greater than, the elongation of the cables 10a and 10b of the reinforcement, these elongations being elastic. Moreover, the cables of the strips 13 and 14 have a diameter less than (for example, two-thirds) that of the cables 10a and 10b of the reinforcement, the number of the cables of the connecting strips 13 and 14 being such that the two bridges that they form have together a longitudinal mechanical resistance at least equal to, and preferably slightly greater than, that of the layer formed by the reinforcing cables 10a and 10b.

The length of the cables of the strips 13 and 14 must be sufficient that, when they transmit the forces due to the tension of the belt in use, the rubber layer separating these strips from the cables 10a and 10b does not become unstuck or does not tear. This depends on the nature of the rubber used and the possible treatments to which the cables are submitted; generally, the length of the strips 13 and 14 is between one and 1½ times the width of the belt.

In the embodiment of FIG. 1, the belt is assumed to have a width of 40cm and to be intended to undergo tensions of 60kg/cm in use; its reinforcement is constituted by parallel longitudinal steel cables having a diameter of 2.4mm, the axes being separated by 4mm and is assumed to have a longitudinal resistance of 365kg and an elastic elongation of 1.2 percent under tension in use; the steel cables of the strips 13 and 14 have a length of 550mm, a diameter of 1.5mm, a longitudinal resistance of 150kg and, under tension in use, an elongation of 2.5 percent whilst remaining elastic; they are separated by 2.5mm and the layer of rubber or other elastomeric material deposited by calendering, is assumed to have a thickness of 0.2mm above and below these cables. The ends are cut to a complementary saw-tooth shape having a height of 50mm and a base of 50mm, as shown in FIG. 2. A belt to the preceding dimensions and formed in endless or continuous fashion by the joint of FIG. 1 was tested, passing it over on two transport drums having a diameter of 600mm, the axes of which were 8m apart, and the tension exerted was equal to twice the normal tension in use and the linear speed was 3.7m/sec. At the end of 300 hours in operation, the belt remained intact and, in order to effect a rupture of the joint, it was necessary to subject it for another 200 hours to a tension equal to three times the normal tension in use.

On a similar belt formed into endless or continuous fashion by a joint different from that of the invention where a single connecting strip comprising cables identical to those of the reinforcement made a single bridge between the ends, the joint opened up after less than 60 hours under a tension equal only to the normal tension in use.

In the case where the reinforcement of the belt comprises in addition to the layer of parallel longitudinal cables, one or more further layers of parallel transverse cables, it was sufficient to remove the transverse cables at the same time as the coverings without replacing them, the joint according to the invention rendering this unnecessary.

A conveyor belt utilizing the joint shown in FIG. 3 is intended more particularly to be subjected to increased tensions and to be passed over transport drums of small diameter. The reinforcement of this belt is constituted by a layer 17 of longitudinal parallel metal cables and by two layers 18 and 19 situated on either side of the layer 17 and formed by transverse parallel metal cables.

In order to make the joint, the ends of the belt were cut up into saw-tooth shapes as in the joint of FIG. 1 and, at each end, the cables of the layers 18 and 19 were removed for a length between half the width of, and the same width as, the belt, in such a fashion as to expose the cables of the layer 17 at one of the ends 17a and 17b. Before placing the two connecting strips 20 and 21 constituted by longitudinal metal cables embedded in rubber, the cables of the layer 17 were covered by two strips 22 and 23 located over the line of the joint between the ends 17a and 17b on either side of the layer 17, said two strips 22 and 23 being of a woven fabric, for example of a plain weave, covered in rubber. The strips 22 and 23 are rectangular and their width is sufficient to cover at least the whole of the surface occupied by the saw-teeth formed by the line of the joint of the ends 17a and 17b of the cables of the layer 17, for example, if the saw-teeth have a height of 50mm, the strips 22 and 23 may have a width of 80mm.

After the connecting strips 20 and 21 were put into position, straps 24, 25, 26 and 27 made from a fabric identical to that used for the fabric of the strips 22 and 23 were positioned over the ends of the connecting strips 20 and 21, these straps being applied over both the connecting strips and that part of the ends 17a and 17b left uncovered by the connecting strips 20 and 21. The coverings were then reconstituted as in the preceding example without replacing the transverse cables of the layers 18 and 19 which were removed with these coatings. This joint was also made on the same belt as that of the embodiment of FIG. 1 in a fashion identical to that embodiment, except that the fabric strips 22 and 23 and straps 24, 25, 26 and 27 of FIG. 3 were put in position; these strips and straps each had a width of 80mm and the fabric, of plain woven type, was of a polyamide and had a resistance of 40kg/cm in the direction of the warp and in that of the weft. The belt was tested on the same test bench. It functioned for 300 hours under a tension equal to 2.5 times the normal tension in use and then for a further 300 hours at three times the normal tension in use and 200 hours at 3.5 times the normal tension in use. At the end of these 800 hours of use, in particularly severe conditions, the joint still remained intact. After the tests were carried on still further, the belt was broken but beyond the limits of the joint. This showed that the fabric strips 22 and 23 and straps 24, 25, 26 27 give very useful results when the belt is not intended for severe use but that they are even more useful in cases where the belt is to be submitted to severe use.

We claim:

1. A method of making a joint for a conveyor belt made from rubber or like elastomeric material, provided with a reinforcement constituted by at least one layer of longitudinal metal cables, which method consists in positioning two connecting strips of longitudinal metal cables in bridge fashion over the abutting ends of the reinforcing layer of the belt, said strips being placed on either side of said reinforcing layer and being connected thereto by a thin layer of elastomer adhering to both of them.

2. A method according to claim 1, wherein the metal cables forming said two connecting strips have an elastic elongation at least equal to the elongation of the cables of said reinforcing layer of the belt.

3. A method according to claim 1, wherein two fabric strips are positioned over part of the ends of said reinforcing layer to cover the junction line between the latter, on each side of the belt, and wherein further fabric straps are positioned to cover the ends of each said connecting strip and a part of the reinforcing layer of the belt.

4. A method according to claim 1, wherein the ends of the reinforcing layer of the belt are cut up into complementary saw-tooth shapes.

5. A method according to claim 1, wherein the diameter of the cables of said connecting strips is less than the diameter of the longitudinal reinforcing cables of the belt.

6. A conveyor belt of rubber or like elastomeric material provided with a reinforcement constituted by at least one layer of longitudinal metal cables, said belt having a joint between two abutting ends of said reinforcing layer, said joint comprising two connecting strips of longitudinal metal cables located in bridge fashion over said abutting ends on both sides of said belt and connected thereto by a thin layer of elastomer adhering to both of them.

7. A conveyor belt according to claim 6, wherein two fabric strips are positioned over part of the ends of said reinforcing layer to cover the junction line between the latter, on each side of the belt, and wherein further fabric straps are positioned to cover the ends of each said connecting strip and a part of the reinforcing layer of the belt.

8. A conveyor belt according to claim 6, wherein the ends of the reinforcing layer of the belt are cut up into complementary saw-tooth shapes.

9. A conveyor belt according to claim 6, wherein the diameter of the cables of said connecting strips is less than the diameter of the longitudinal reinforcing cables of the belt.

* * * * *